(12) United States Patent
Neale

(10) Patent No.: US 6,655,729 B2
(45) Date of Patent: Dec. 2, 2003

(54) BRIDGE ASSEMBLY

(75) Inventor: Colin G. Neale, Northville, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/243,588

(22) Filed: Sep. 13, 2002

(65) Prior Publication Data

US 2003/0062742 A1 Apr. 3, 2003

Related U.S. Application Data

(60) Provisional application No. 60/322,129, filed on Sep. 13, 2001.

(51) Int. Cl.[7] .................................................. B60J 7/00
(52) U.S. Cl. ...................................................... 296/193
(58) Field of Search ................................. 296/193, 188, 296/189, 203.01, 37.16, 203.03, 63, 68.1, 185

(56) References Cited

U.S. PATENT DOCUMENTS

| | | | |
|---|---|---|---|
| 2,597,837 A | | 5/1952 | Lindsay |
| 3,917,339 A | * | 11/1975 | Fritz ........................... 296/68.1 |
| 3,944,276 A | * | 3/1976 | de Rosa et al. ............. 296/188 |
| 4,231,607 A | * | 11/1980 | Bohlin ......................... 296/63 |
| 4,349,167 A | * | 9/1982 | Reilly ......................... 296/68.1 |
| 4,512,604 A | | 4/1985 | Maeda et al. |
| 4,573,546 A | * | 3/1986 | Irimajiri et al. ............. 296/185 |
| 4,770,459 A | * | 9/1988 | Nakaiwa et al. ............ 296/188 |
| 4,971,379 A | * | 11/1990 | Rumpel et al. .............. 296/63 |
| 5,435,618 A | * | 7/1995 | Sacco et al. ................ 296/188 |
| 5,476,303 A | | 12/1995 | Sakamoto et al. |
| 5,516,179 A | * | 5/1996 | Tidwell ........................ 296/63 |
| 5,584,525 A | | 12/1996 | Nakano et al. |
| 5,954,390 A | * | 9/1999 | Kleinhoffer et al. ......... 296/188 |
| 6,053,567 A | * | 4/2000 | Ito .............................. 296/188 |
| 6,168,228 B1 | * | 1/2001 | Heinz et al. ................ 296/188 |
| 6,189,952 B1 | * | 2/2001 | Schmidt et al. ............. 296/188 |
| 6,220,654 B1 | | 4/2001 | Sommer |
| 6,237,991 B1 | * | 5/2001 | Weber ........................ 296/188 |
| 6,299,238 B1 | * | 10/2001 | Takagi et al. ............... 296/188 |
| 6,299,239 B1 | * | 10/2001 | Sagawa et al. .............. 296/188 |
| 6,398,285 B2 | * | 6/2002 | Motozawa et al. ......... 296/68.1 |
| 6,398,292 B2 | * | 6/2002 | Tsuruta et al. .............. 296/188 |
| 6,402,218 B1 | * | 6/2002 | Kamei et al. .............. 296/68.1 |
| 6,422,632 B1 | * | 7/2002 | Kamei et al. .............. 296/68.1 |
| 6,568,745 B2 | * | 5/2003 | Kosuge et al. ............. 296/188 |
| 2001/0013711 A1 | * | 8/2001 | Motozawa et al. ......... 296/68.1 |

FOREIGN PATENT DOCUMENTS

EP 1251061 * 10/2002

* cited by examiner

*Primary Examiner*—Kiran Patel
(74) *Attorney, Agent, or Firm*—Clark Hill PLC

(57) ABSTRACT

A bridge assembly for supporting a seat in a motor vehicle having opposing B-pillars and a floor extending therebetween. The bridge assembly includes a rear cross car beam having a rear length extending between a rear driver end and a rear passenger end. The rear driver and rear passenger ends are fixedly secured to each of the B-pillars such that the rear cross car beam extends over the floor spaced apart therefrom. A front support structure is spaced forward of the rear cross car beam. In addition, the bridge assembly includes a crossing support extending between the rear cross car beam and the front support structure for strengthening the bridge assembly.

19 Claims, 3 Drawing Sheets

BRIDGE ASSEMBLY

This application claims the benefit of Provisional Application No. 60/322,129, filed Sep. 13, 2001.

BACKGROUND OF THE INVENTION

1. Field of the Invention

The invention relates to a bridge assembly for supporting a seat of a motor vehicle. More particularly, the invention is directed to a bridge assembly that supports a front seat above a floor of a motor vehicle.

2. Description of the Related Art

A motor vehicle typically includes one or more rows of seats located throughout a passenger compartment for supporting passengers thereon. A front row, for example, may include a pair of bucket-type seats or a single bench-type seat at a front portion of the passenger compartment. Typically, each seat is supported above a floor of the motor vehicle by front seat risers. But these structures have the undesirable effect of dividing the space below the seat(s) into many smaller areas, making storage of items thereunder more difficult.

Various structural members have been developed to support the seat(s) while, at the same time, allowing for greater distribution of side impact forces to the motor vehicle. One example of such a structural member is found in U.S. Pat. No. 5,954,390 to Kleinhoffer et al., which discloses a cross-car side impact beam for supporting one or more seats of a motor vehicle thereabove. The cross-car side impact beam is secured to B-pillars along opposing sides of the motor vehicle, and is spaced above a floor thereof. The cross-car side impact beam has a rearwardly and upwardly sloped portion at its lower surface for providing additional foot space for rear seat passengers or storage space under the seat(s). But the cross-car side impact beam supports only a rear portion of the seat(s) thereabove; a structure is still required to support a front portion of the seat(s). Thus, it would be advantageous to provide a structural member that supports the front and rear portions of the seat(s) thereabove and, at the same time, assists in distribution of side impact forces to the motor vehicle.

SUMMARY OF THE INVENTION

A bridge assembly supports a seat in a motor vehicle having opposing B-pillars and a floor extending therebetween. The bridge assembly includes a rear cross car beam having a rear length extending between a rear driver end and a rear passenger end. The rear driver and rear passenger ends are fixedly secured to each of the B-pillars such that the rear cross car beam extends over the floor spaced apart therefrom. A front support structure is spaced forward of the rear cross car beam. In addition, the bridge assembly includes a crossing support extending between the rear cross car beam and the front support structure for strengthening the bridge assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
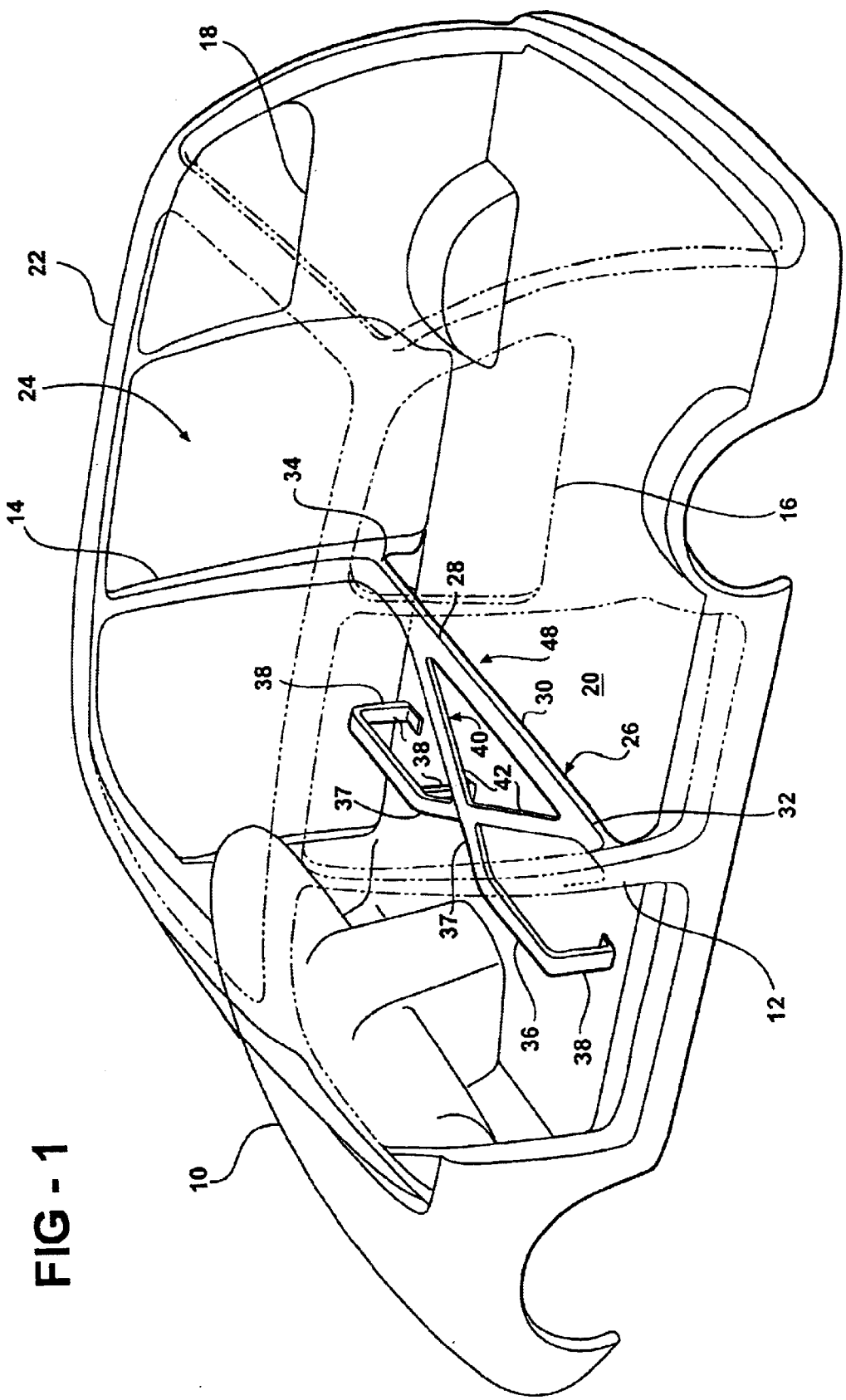
FIG. 1 is a rear, perspective view of a motor vehicle including a bridge assembly of a first embodiment of the invention.
Figure 2:
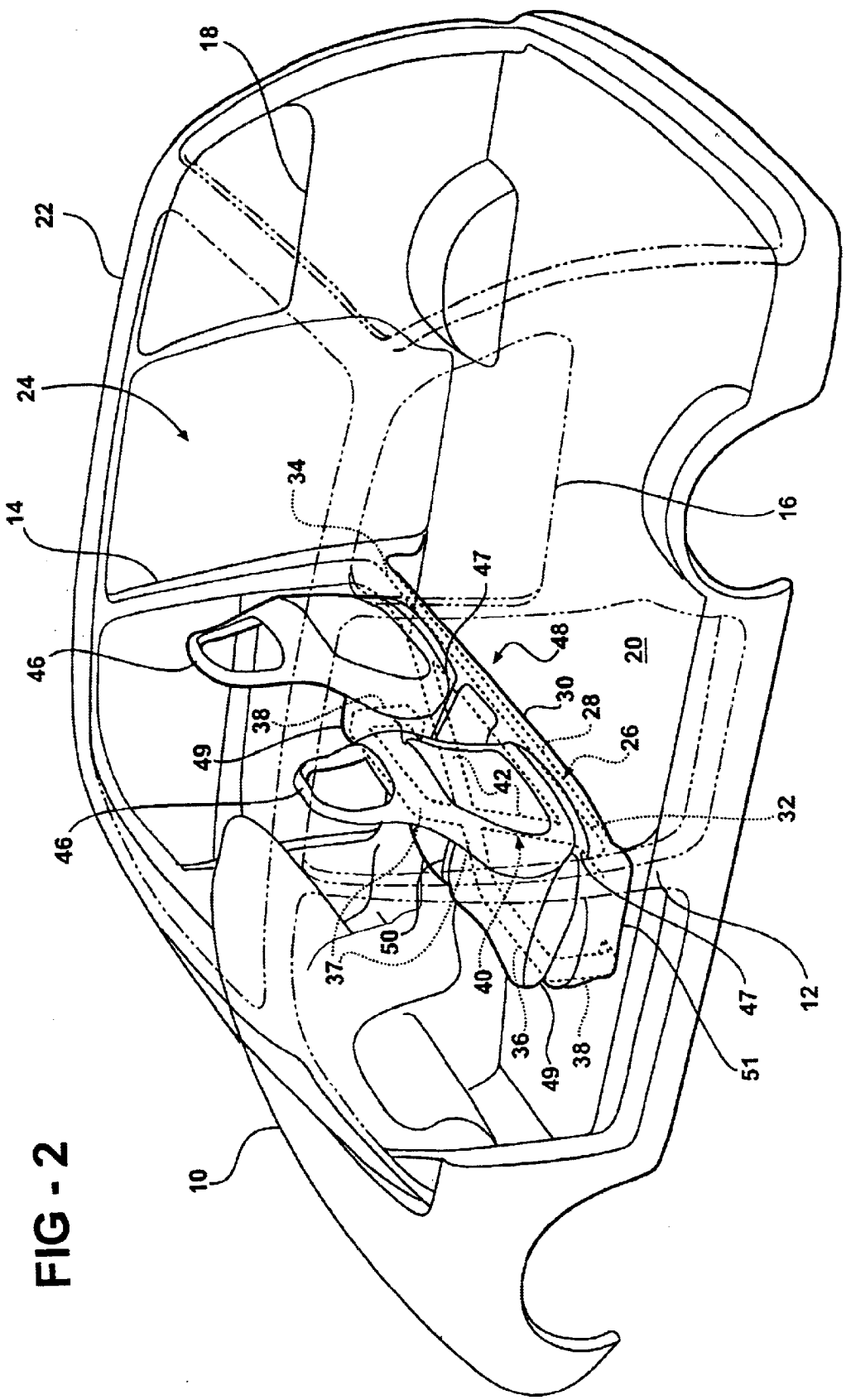
FIG. 2 is a rear, perspective view of a pair of seats supported above a floor by the first embodiment of the invention.

Referring to FIGS. 1 and 2, a motor vehicle 10 includes a pair of opposing B-pillars 12, 14 for providing structural reinforcement to sidewalls 16, 18. More specifically, the B-pillars 12, 14 distribute side impact forces over the sidewalls 16, 18 of the motor vehicle 10. The B-pillars 12, 14 extend between upper ends 11, 13 and lower ends 15, 17. The upper ends 11, 13 are fixedly secured to a roof 22 and the lower ends 15, 17 are fixedly secured to a floor 20. The B-pillars 12, 14 extend between the floor 20 and the roof 22. Together, the sidewalls 16, 18, the floor 20, and the roof 22 define a passenger compartment 24.

A bridge assembly, generally shown at 26, includes a rear cross car beam 28 fixedly secured to the B-pillars 12, 14 to provide structural rigidity and support thereto. The rear cross car beam 28 defines a rear length 30 extending between a rear driver end 32 and a rear passenger end 34. The rear cross car beam 28 is fixedly secured to the B-pillars 12, 14 at its rear driver 32 and rear passenger 34 ends by fasteners, welds, or the like so as to be spaced above the floor 20. More specifically, the rear cross car beam 28 is secured to the two B-pillars 12, 14 at locations between the upper 11, 13 and lower 15, 17 ends.

The bridge assembly 26 also includes a front support structure, generally shown at 35, spaced forward of the rear cross car beam 28 within the passenger compartment 24. In the first embodiment, the front support structure 35 is a front cross car beam 36. The front cross car beam 36 includes a plurality of support legs 38 extending downwardly therefrom. Each of the plurality of support legs 38 is fixedly secured to the floor 20 to support the front cross car beam 36 above the floor 20.

The front cross car beam 36 includes forward segments 37 spaced apart and extending along the same line. It will be appreciated that the front cross car beam 36 may have various configurations depending upon motor vehicle design preferences. For example, the front cross car beam 36 may include a single forward segment 37 extending across the entire passenger compartment 24 parallel to the rear cross car beam 28.

A crossing support, generally shown at 40, is fixedly secured to, and extends above the floor 20 between, the rear cross car beam 28 and the front support structure 35. In the first embodiment, the crossing support 40 includes a plurality of cross beams 42 fixedly secured to the rear 28 and front 36 cross car beams. In a preferred embodiment, each of the plurality of cross beams 42 is coplanar with the rear cross car beam 28 while extending outwardly from the rear cross car beam 28 at angles of approximately forty-five degrees and one hundred and thirty-five degrees, i.e., they create supplementary angles. The plurality of cross beams 42 intersect or cross over each other. It should be appreciated, however, that the plurality of cross beams 42 may extend outwardly from the rear cross car beam 28 at angles other than forty-five degrees.

The extension of the plurality of cross beams 42 between the rear 28 and front 36 cross car beams allows the bridge assembly 26 to support one or more seats 46 thereabove. More specifically, the bridge assembly 26 supports the seats 46 by having a rearward portion 47 and a forward portion 49 thereof fixedly secured thereto above the floor 20. Thus, the bridge assembly 26 defines an undivided space 48 thereunder that may be utilized for storage of items or as additional foot space for passengers occupying a rear seat. A center console 50 extending between the rear 28 and front 36 cross car beams, and between the seats 46, may be integrated into the bridge assembly 26. A bridge cover 51 may provide an aesthetically pleasing appearance.

The bridge assembly 26 creates a load path such that upon a side impact, forces are distributed from one of the B-pillars 12, 14 to the other B-pillar 12, 14. The support legs 38, which are secured to the floor 20 and the front cross car beam 36, further distribute the lateral load into the floor 20. Therefore, side impact forces on the motor vehicle 10 may be more evenly distributed through the bridge assembly 26, which is supported between the B-pillars 12, 14, and into the floor 20 and sidewalls 16, 18.

Figure 3:
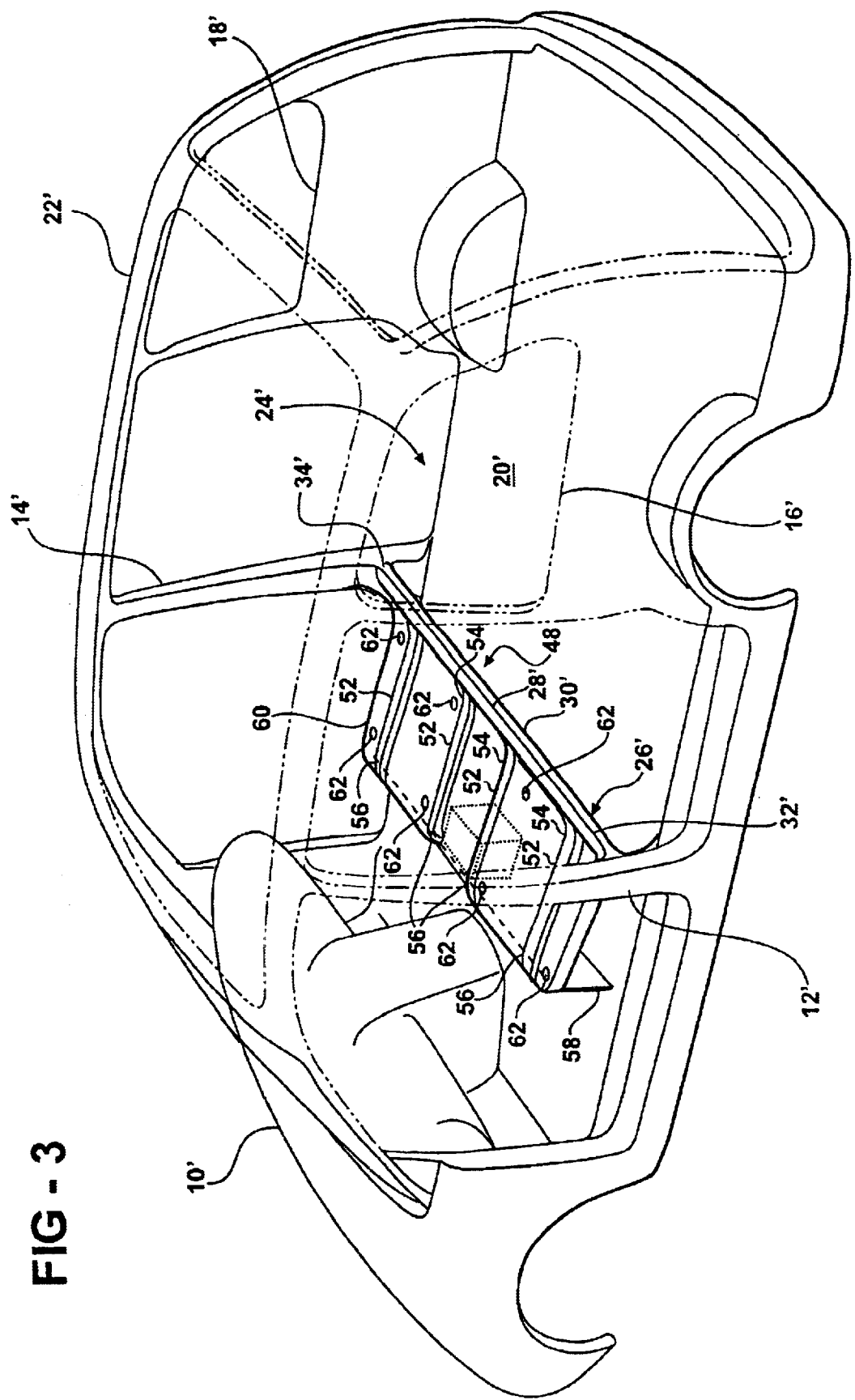
FIG. 3 is a rear, perspective view of a motor vehicle including a second embodiment of the invention.

Referring to FIG. 3, wherein like primed reference numerals represent similar elements as those described above, a second embodiment incorporates a support plate 58 as the front support structure 35'. The support plate 58, which is spaced forward of the rear cross car beam 28', is fixedly secured to the floor 20'. The plurality of cross beams 42' extends between the support plate 58 and the rear cross car beam 28' parallel to each other. Thus, the plurality of cross beams 42' is supported above the floor 20' by the support plate 58 and the rear cross car beam 28'.

A panel 60 is supported above the floor 20' by the rear cross car beam 28' and the plurality of cross beams 42'. The panel 60 defines a plurality of mounting bores 62 through which a fastener extends to fixedly attach one or more seats 46' to the bridge assembly 26'. Instead of a single panel, a plurality of panels may be utilized with each of the plurality of panels being supported by one or more of the plurality of cross beams 42', and the rear cross car beam 28'.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practised other than as specifically described.

What is claimed is:

1. A bridge assembly for supporting a seat in a motor vehicle having opposing B-pillars and a floor extending therebetween, said bridge assembly comprising:
 a rear cross car beam including a rear length extending between a rear driver end and a rear passenger end, said rear driver end and said rear passenger end fixedly secured to each of the B-pillars such that said rear cross car beam extends over the floor spaced apart therefrom;
 a front support structure spaced forward of said rear cross car beam; and
 a crossing support extending between said rear cross car beam and said front support structure for strengthening said bridge assembly.

2. A bridge assembly as set forth in claim 1 wherein said crossing support includes a plurality of cross beams extending between said rear cross car beam and said front support structure.

3. A bridge assembly as set forth in claim 2 wherein said front support structure includes support legs extending downwardly therefrom.

4. A bridge assembly as set forth in claim 3 wherein said support legs are fixedly secured to the floor.

5. A bridge assembly as set forth in claim 4 wherein one of said plurality of cross beams intersects another of said plurality of cross beams.

6. A bridge assembly as set forth in claim 1 including a panel supported above the floor.

7. A bridge assembly as set forth in claim 6 wherein said front support structure includes a support plate fixedly secured to the floor.

8. A bridge assembly as set forth in claim 7 wherein said panel is partially supported above the floor by said support plate.

9. A bridge assembly as set forth in claim 8 wherein said panel defines a plurality of mounting bores.

10. A bridge assembly as set forth in claim 9 including a plurality of cross beams extending between said rear cross car beam and said support plate.

11. A bridge assembly for supporting a seat in a motor vehicle having opposing B-pillars and a floor extending therebetween, said bridge assembly comprising:
 a rear cross car beam including a rear length extending between a rear driver end and a rear passenger end, said rear driver end and said rear passenger end fixedly secured to each of the B-pillars such that said rear cross car beam extends over the floor spaced apart therefrom;
 a crossing support extending forwardly out from said rear cross car beam; and
 a support plate fixedly secured to said crossing support for supporting said crossing support above the floor.

12. A bridge assembly as set forth in claim 11 wherein said crossing support includes a plurality of cross beams.

13. A bridge assembly as set forth in claim 12 wherein said support plate is fixedly secured to the floor.

14. A bridge assembly as set forth in claim 13 including a panel supported above the floor and said plurality of cross beams.

15. A bridge assembly as set forth in claim 14 wherein said panel extends between said rear driver and rear passenger ends of said rear cross car beam.

16. A bridge assembly as set forth in claim 15 wherein said panel defines a plurality of mounting bores.

17. A bridge assembly as set forth in claim 16 including a plurality of panels supported above the floor by said plurality of cross beams.

18. A bridge assembly as set forth in claim 17 wherein each of said plurality of panels is supported above the floor by said rear cross car beam.

19. A bridge assembly as set forth in claim 18 wherein each of said plurality of panels defines a plurality of mounting bores.

\* \* \* \* \*